US008602379B2

(12) United States Patent
Laney et al.

(10) Patent No.: US 8,602,379 B2
(45) Date of Patent: *Dec. 10, 2013

(54) TIE DOWN FOR A VEHICLE ASSEMBLY

(76) Inventors: Therin Laney, Shelton, WA (US);
Steven Swearington, Shelton, WA (US);
Don Van Orman, Elma, WA (US)

(*) Notice: Subject to any disclaimer, the term of this patent is extended or adjusted under 35 U.S.C. 154(b) by 142 days.

This patent is subject to a terminal disclaimer.

(21) Appl. No.: 12/364,317

(22) Filed: Feb. 2, 2009

(65) Prior Publication Data

US 2010/0193657 A1    Aug. 5, 2010

(51) Int. Cl.
*A47B 97/00*    (2006.01)

(52) U.S. Cl.
USPC ........... 248/503; 248/499; 248/500; 410/100; 410/101; 410/23

(58) Field of Classification Search
USPC ............. 224/534, 568, 924; 403/78; 340/440, 340/425.5; 182/8; 411/15, 427, 439, 24; 248/499, 500, 503, 503.1; 410/97, 96, 410/101, 102, 106, 50, 23, 11; 24/68 R, 24/69 CT See application file for complete search history.

(56) References Cited

U.S. PATENT DOCUMENTS

| 1,852,089 | A | * | 4/1932 | Pleister ........................... 411/24 |
| 3,544,705 | A | | 12/1970 | Winston |
| 5,887,840 | A | | 3/1999 | Hoffman |
| 6,263,742 | B1 | * | 7/2001 | Gruson et al. ............. 73/862.23 |
| D446,442 | S | * | 8/2001 | Simpson ........................ D8/354 |
| 6,280,128 | B1 | * | 8/2001 | Schrader ......................... 410/97 |
| 6,293,742 | B1 | * | 9/2001 | Miyagi et al. ................. 409/132 |
| 6,503,035 | B1 | | 1/2003 | Perrott |
| 6,729,815 | B2 | | 5/2004 | Hornady |
| 6,758,643 | B1 | | 7/2004 | Hsieh |
| 6,761,519 | B2 | * | 7/2004 | Alderman ......................... 410/3 |
| 6,957,938 | B1 | * | 10/2005 | Beasley ........................ 410/100 |
| 7,214,014 | B2 | | 5/2007 | Stanley |
| 7,219,951 | B2 | * | 5/2007 | Rasmussen ................... 296/156 |
| 8,002,505 | B2 | * | 8/2011 | Laney et al. .................. 410/101 |
| 2003/0103831 | A1 | * | 6/2003 | Alderman .................... 410/100 |
| 2003/0201377 | A1 | | 10/2003 | Davis |
| 2009/0208306 | A1 | * | 8/2009 | Laney et al. .................. 410/101 |

FOREIGN PATENT DOCUMENTS

EP    0255281 A2    2/1988

OTHER PUBLICATIONS

International Search Report and Written Opinion mailed Aug. 18, 2009, issued in International Application No. PCT/US2009/031825, filed Jan. 23, 2009.

* cited by examiner

*Primary Examiner* — Todd M Epps

(74) *Attorney, Agent, or Firm* — Christensen O'Connor Johnson Kindness PLLC

(57) ABSTRACT

A tie down assembly for a vehicle is provided. The tie down assembly includes a retention body, an anchoring device moveably disposed within the retention body, and a stop translatable along the anchoring device into releasable locking engagement with a portion of the retention body when the anchoring device is rotated in a first direction.

8 Claims, 3 Drawing Sheets

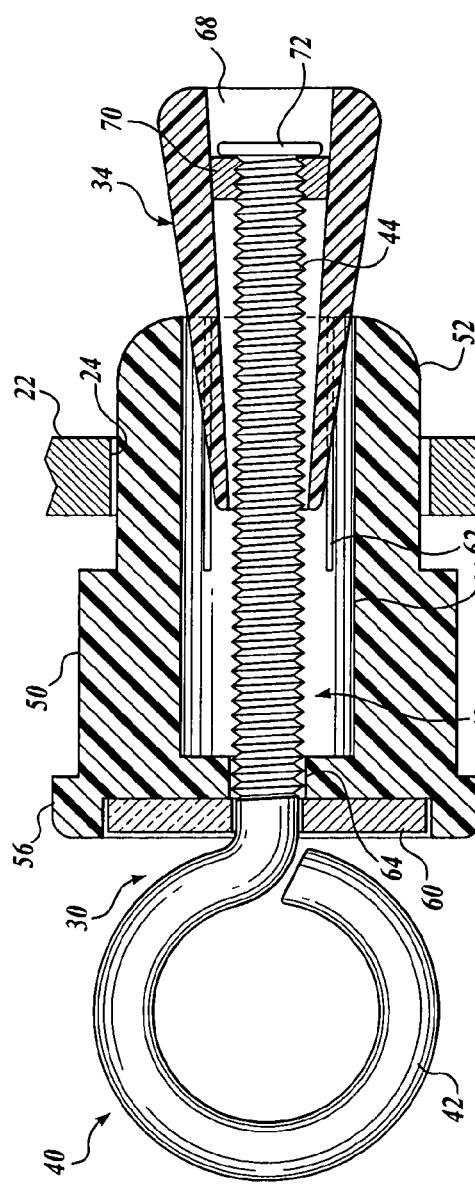
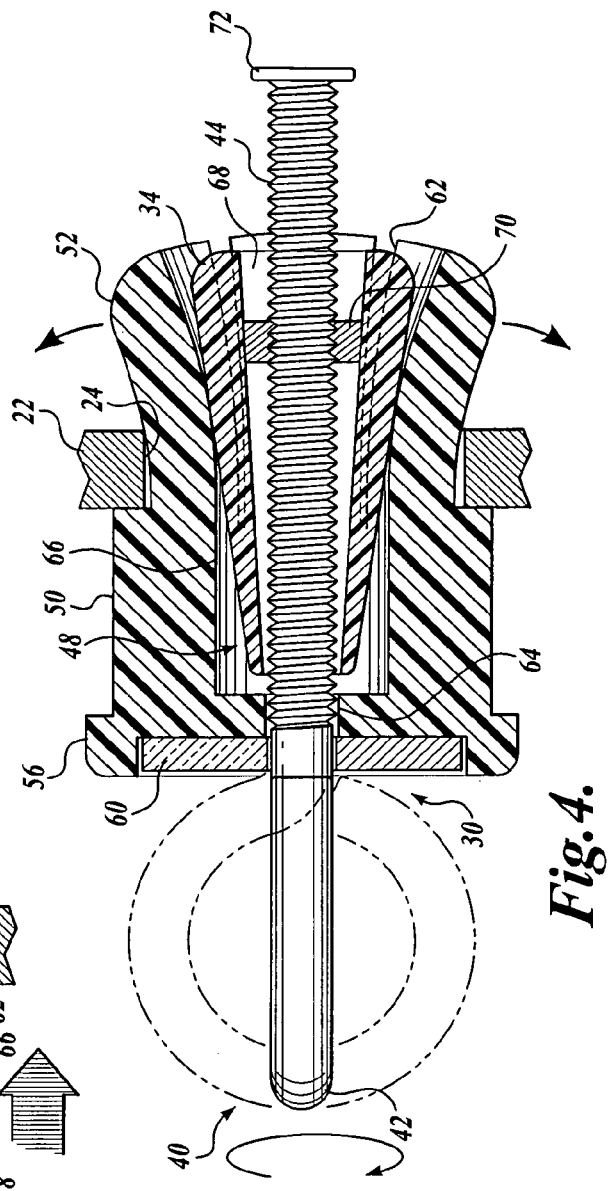
Fig. 3.
Fig. 4.

TIE DOWN FOR A VEHICLE ASSEMBLY

BACKGROUND

Utility and recreation vehicles, including pick-up trucks and medium weight flat bed trucks, often include a bed having partial sidewalls. Such sidewalls extend at least three feet from the floor of the bed. To accommodate loads requiring higher sidewalls, a plurality of post bores are positioned along the length of the sidewalls. These post bores are sized to receive a post forming extensions of the sidewalls. When not in use, such post bores include a drill port located in the bottom of the post bores to permit drainage.

Regardless of whether the bed of such vehicles include sidewall extensions, it is becoming more commonplace for states to enact laws requiring loads be secured within the bed. In the past, load binding cables were often strung between the post bores of opposing sidewalls and were secured to the post bores by a clip, such as an S-shaped clip, attached to opposite ends of the load binding cables. In other arrangements, the ends of load binding cables were either tied to opposite sides of the beds or where attached to an overhang located at the top of opposed sidewalls. Although effective, existing methods of attaching such load binding cables to the bed of a vehicle are not without their problems.

As an example, the clip of the load binding cable may slip from its attachment point to the bed. In other examples, tying the ends of the load binding cables to opposing sidewalls did not provide a secure coupling of the load binding cable to the sidewalls. As such, there exists a need for a low cost and effective tie down assembly for a vehicle.

SUMMARY

A tie down assembly for a vehicle is provided. The tie down assembly includes a retention body, an anchoring device moveably disposed within the retention body, and a stop translatable along the anchoring device into releasable locking engagement with a portion of the retention body when the anchoring device is rotated in a first direction.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become better understood by reference to the following detailed description, when taken in conjunction with the accompanying drawings, wherein:

FIG. 3 is a cross-sectional side planar view of the tie down assembly of FIG. 1, showing the tie down assembly in a release position; and FIG. 4 is a cross-sectional side planar view of the tie down assembly of FIG. 3, showing the tie down assembly in a restraint position.

DETAILED DESCRIPTION

A tie down assembly 20 constructed in accordance with one embodiment of the present disclosure may be best understood by referring to FIGS. 1-4. The tie down assembly 20 is illustrated and referenced with respect to providing a portable anchor point of a vehicle (not shown) having sidewalls 22. Such well-known sidewalls 22 include an attachment bore 24 located either within the sidewall 22 itself or within a post bore (not shown) extending vertically through the top of the sidewall 22. It should be apparent that the location of the attachment bore 24 is for illustrative purposes only and is not intended to be limiting.

Figure 1:
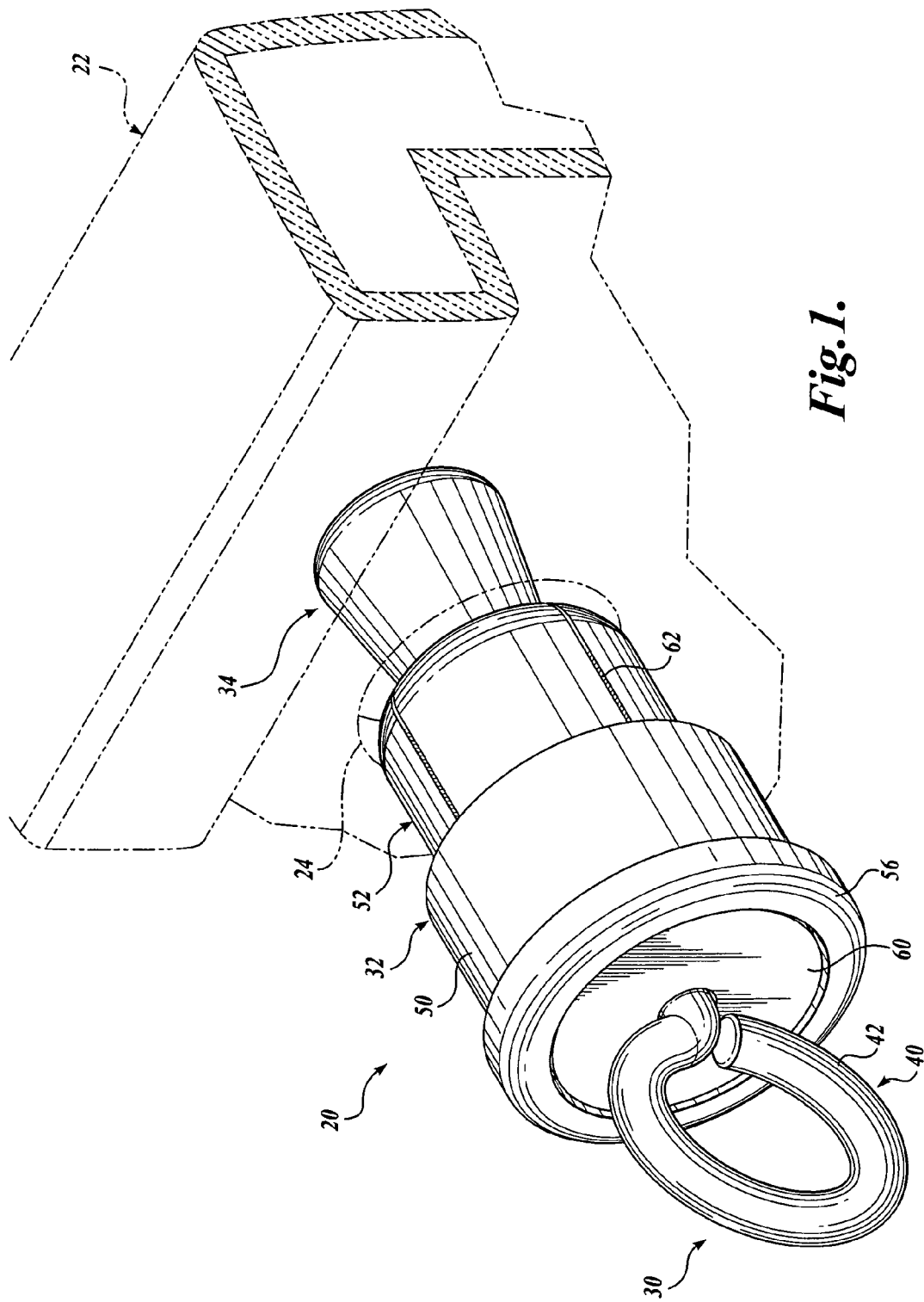
FIG. 1 is an isometric view of a tie down assembly constructed in accordance with one embodiment of the present disclosure.
Figure 2:
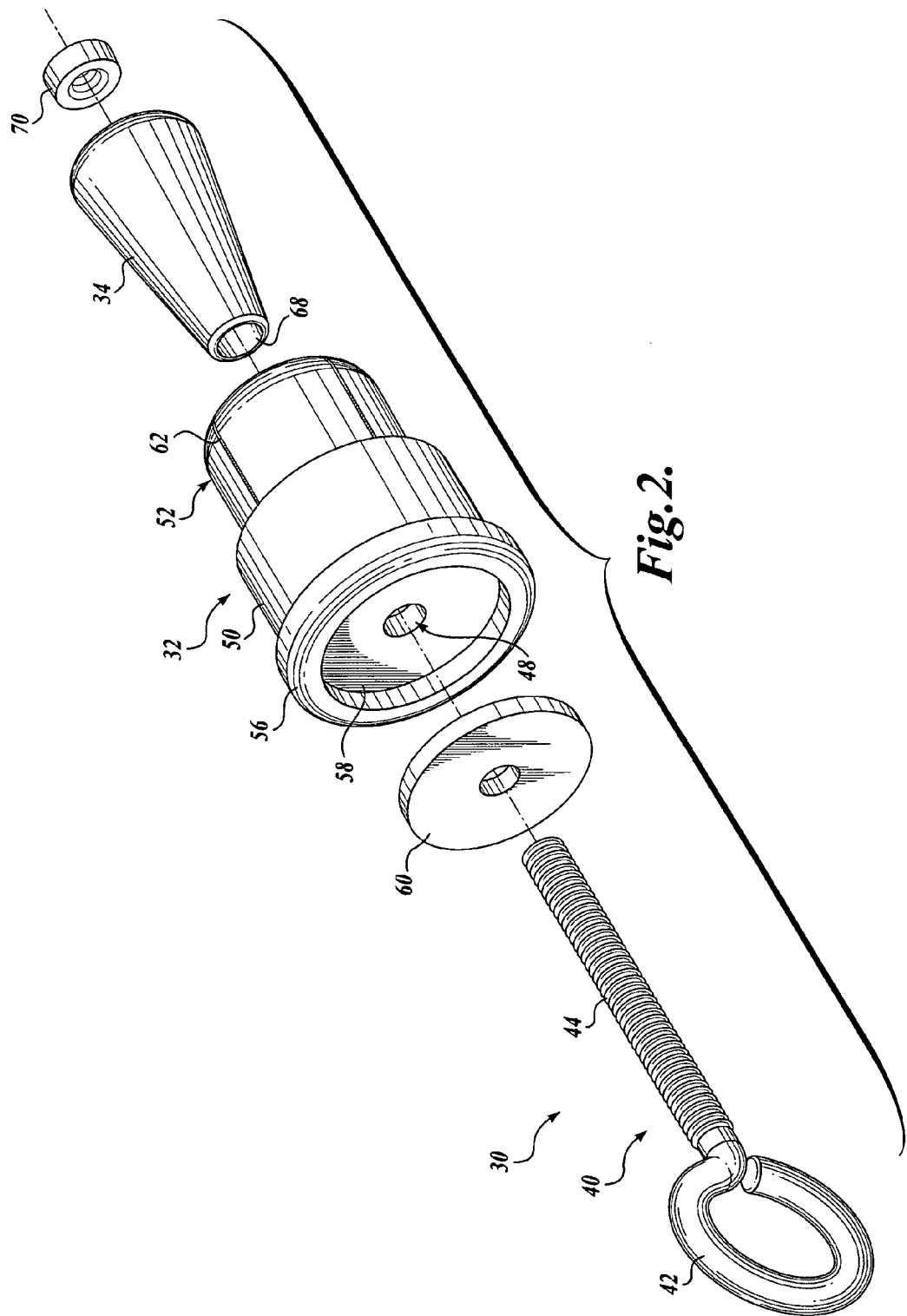
FIG. 2 is an exploded view of the tie down assembly of FIG. 1.

Referring to FIGS. 1 and 2, the tie down assembly 20 includes an anchoring member 30, a retention body 32, and a stop 34. The anchoring member 30 is defined by an eye bolt 40 having an eyelet 42 and a threaded portion 44. The eye bolt 40 is shown as a wire eye bolt; however, it should be appreciated that any other suitable eye bolt or eye screw may instead be used, such as a forged eye bolt, a forged machinery eye bolt, or an eye bolt with a shoulder. Moreover, it should be appreciated that the anchoring member 30 may instead be defined by any threaded member having an attachment device, such as an eyelet, formed on or attached to the end thereof. The threaded portion 44 of the eye bolt 40 is moveably received within a through-hole 48 formed in the retention body 32 and extending along the length of the retention body 32.

The retention body 32 includes a collar 50 and a stop portion 52 that are preferably integrally formed from a plastic, such as polyvinyl chloride. However, other embodiments, such as an embodiment that includes separately formed collars and stop portions press fitted together, are also within the scope of the present disclosure. The collar 50 and the stop portion 52 are substantially circular in cross-section, with the stop portion 52 being sized and configured to be received within the attachment bore 24 of a vehicle sidewall 22. The cross-sectional diameter of the collar 50 is at least somewhat greater that the cross-sectional diameter of the stop portion 52 such that a shoulder 54 is defined between the collar 50 and the stop portion 52. The shoulder 54 abuts against the vehicle sidewall 22 when the stop portion 52 is received within the attachment bore 24 to prevent the collar 50 from sliding within the attachment bore 24 and to indicate that the stop portion 52 is fully received within the attachment bore 24. It should be appreciated that the retention body 32 may instead include an annular protrusion or another suitable protrusion extending from the outer surface of the body to prevent the collar 50 from passing into the attachment bore 24.

The collar 50 includes a flanged end 56 that extends radially outwardly from the outer surface of the collar 50 and acts as a grip when pulling the stop portion 52 out from within the attachment bore 24. The flanged end 56 may define a recess 58 that surrounds the through-hole 48 formed in the retention body 32 that is sized and configured to receive a washer 60 therein. The washer 60 is positioned between the eyelet 42 of the eye bolt 40 and the collar 50 of the retention body 32 when the threaded portion 44 of the eye bolt 40 is received within the through-hole 48 of the retention body 32. However, it should be appreciated that the recess 58 and washer 60 may be eliminated without departing from the scope of the present disclosure.

Referring also to FIGS. 3 and 4, the through-hole 48 formed in the retention body 32 preferably includes a first diameter portion 64 formed in the collar 50 that is sized and configured to rotatably receive and retain the threaded portion 44 of the eye bolt 40 therein. The through-hole 48 further includes a second enlarged diameter portion 66 formed in the stop portion 52 that is sized and configured to slidably receive at least a portion of the stop 34 therein. The second diameter portion 66 may extend into the collar 50 a predetermined amount such that the stop 34 may be sufficiently received within the retention body 32. The stop portion 52 includes a plurality of splits 56 extending along the length of the stop portion 52 that permit the stop portion 52 to be splayed radially as the stop 34 is pulled into the through-hole 48 of the retention body 32.

The stop 34 is suitably manufactured from a high strength multiple plastic material, such as polyvinyl chloride. In one embodiment, the stop 34 is bell-shaped in configuration, such that the stop increases is cross-sectional diameter along an axis extending longitudinally through the stop 34 from a first diameter to a second diameter. As a non-limiting example, the stop 34 increases from a smaller diameter to a larger diameter, thereby resulting in the bell-shaped configuration.

The stop 34 includes a through-hole 68 extending along substantially the center longitudinal axis of the stop 34. A nut 70 or similar device having a threaded interior bore is received within the through-hole 68. The stop 34 may be formed on the nut 70, or the nut 70 may instead be frictionally received within the through-hole 68 of the stop 34. In the alternative, the stop 34 and nut 70 may instead be formed as one integral piece. It should be appreciated that any suitable stop design having a hollow threaded interior portion may instead be used.

The stop 34 is threadably received on the threaded portion 44 of the eye bolt 40 after the threaded portion 44 is passed through the through-hole 48 of the retention body 32. The end of the threaded portion 44 may be flattened to define a stop shoulder 72 to retain the stop 34 on the eye bolt 40. The stop 34 is disposed on the eye bolt 40 such that the smaller diameter portion of the stop is positioned toward the eyelet 42 of the eye bolt 40. As such, the stop 34 is translatable into the retention body 32, narrow end first.

The stop 34 is translated into and out of releasable locking engagement with the retention body 32 by rotating the eye bolt 40 to threadably translate the stop 34 along the eye bolt 40. More specifically, the eye bolt 40 is rotated in a first direction to draw the stop 34 into the retention body 32, and the eye bolt 40 is rotated in a second direction to move the stop 34 in an opposite direction; i.e., out of the retention body 32.

Operation of the tie down assembly 20 may be best understood by referring to FIGS. 3 and 4. In operation, the stop 34 and stop portion 52 are inserted into the attachment bore 24 of the vehicle. Thereafter, an operator rotates the eye bolt 40 in a first direction to draw the stop 34 into the stop portion 52. When turning the eye bolt 40, it may aid the operator to pull the eye bolt 40 outwardly from the retention body 32 to frictionally brace the stop 34 against the retention body 32. In this manner, the stop 34 is prevented from turning with the eye bolt 40, and the stop 34 threadably translates along the eye bolt 40. The operator continues to rotate the eye bolt 34 in the first direction to securely draw the stop 34 within the stop portion 52. This action causes the stop portion 52 to splay radially; and therefore, adjustably resist movement of the stop 34 as it translates in the first direction, as shown in FIG. 4.

The radial splaying action of the stop portion 52 against the perimeter of the attachment bore 24 causes the stop portion 52 to be in an interference fit with the attachment bore 24 to restrain the stop portion 52 within the attachment bore 24. Further, the stop 34 creates an interference fit with the stop portion 52 to resist further movement of the stop 34 as it translates in the first direction. Because of the pinching action between the stop portion 52 and the stop 34 against the perimeter of the attachment bore 24, the tie down assembly 20, in this restraint position, is prevented from further translation relative to the sidewalls 22. As such, a rope or other load binding member may be looped through and attached to the eyelet 42, thereby defining a convenient, removable tie down assembly 20 for a vehicle.

To release the tie down assembly 20 from the restraint position, the eye bolt 40 is rotated in a second direction, causing the stop 34 to be translated along the threaded portion 44 of the eye bolt 40 out from within the stop portion 52, as shown in FIG. 3. The eye bolt 40 is rotated in this second direction until the stop portion 52 is no longer splayed radially, thereby decreasing the diameter of the stop portion 52 such that the entire tie down assembly can be withdrawn from the attachment bore 24.

While illustrative embodiments have been illustrated and described, it will be appreciated that various changes can be made therein without departing from the spirit and scope of the invention.

The embodiments of the present disclosure in which an exclusive property or privilege is claimed are defined as follows:

1. A vehicle assembly, comprising:
   (a) a vehicle body having an exterior surface, an interior surface, wherein the exterior surface is substantially parallel to the interior surface, and an attachment bore extending from the exterior surface to the interior surface and defining an attachment bore length and an attachment bore diameter;
   (b) a tie down removably securable within the attachment bore of the vehicle body, the tie down comprising:
      (i) a retention body having a collar defined at a first end of the retention body and a stop portion defined at a second end of the retention body, the collar having an external collar diameter that is greater than the attachment bore diameter, the stop portion having an interior and a stop portion length that is greater than the attachment bore length such that when the stop portion is received within the attachment bore, the collar abuts against the exterior surface of the vehicle body and the stop portion protrudes from the interior surface of the vehicle body, wherein the stop portion has one or more axial slits formed along the stop portion that are in communication with the interior of the retention body, the stop portion having an external stop portion diameter sized and configured to be releasably received within the attachment bore of the vehicle body;
      (ii) an anchoring device moveably disposed within an interior portion of the retention body for rotational movement between a release position, wherein the stop portion defines a first external stop portion diameter that is substantially uniform in size along the stop portion length, and a restraint position, wherein the stop portion defines a second external stop portion diameter that gradually increases in size along the length of the stop portion, wherein the one or more axial slits in the stop portion allow the stop portion to transition from the first external stop portion diameter to the second external stop portion diameter; and
      (iii) a stop translatable along the anchoring device and engageable with the interior of the stop portion, the stop having a length, wherein the stop gradually increases in diameter along an axis extending through a longitudinal direction of the stop along the length of the stop from a first diameter to a second diameter, wherein the anchoring device is rotatable into the restraint position such that the stop is at least partially received within the interior of the stop portion to transition the stop portion into the second external stop portion diameter, and wherein when the stop portion is transitioned into the second external stop portion diameter, the stop portion resists movement of the stop as it translates along the anchoring device, and wherein the second external stop portion diameter is greater than the attachment bore diameter such that the stop portion engages the interior surface of the vehicle body to selectively define an interference fit between the collar, the stop portion, and the vehicle body when the anchoring device is in the restraint position.

2. The assembly of claim 1, wherein the anchoring device is rotatable in a second direction to translate the stop along the anchoring device out of locking engagement within the stop portion of the retention body, thereby decreasing the external stop portion diameter.

3. The assembly of claim 1, wherein the anchoring device includes a threaded portion and an attachment portion.

4. The assembly of claim 3, wherein the attachment portion comprises an eyelet.

5. A tie down for use with a vehicle having a vehicle body with an exterior surface, an interior surface, wherein the exterior surface is substantially parallel to the interior surface, and an attachment bore extending from the exterior surface to the interior surface and defining an attachment bore length and an attachment bore diameter, the tie down comprising:

(a) a retention body having a collar defined at a first end of the retention body and a stop portion defined at a second end of the retention body, the collar having an external collar diameter that is greater than the attachment bore diameter, the stop portion having an interior and a stop portion length that is greater than the attachment bore length such that when the stop portion is received within the attachment bore the collar abuts against the exterior surface of the vehicle body and the stop portion protrudes from the interior surface of the vehicle body, wherein the stop portion has one or more axial slits formed along the stop portion that are in communication with the interior of the stop portion, the stop portion having an external stop portion diameter sized and configured to be releasably received within the attachment bore of the vehicle;

(b) an anchoring device moveably disposed within an interior portion of the retention body for rotational movement between a release position, wherein the stop portion defines a first external stop portion diameter that is substantially uniform in size along the length of the stop portion, and a restraint position, wherein the stop portion defines a second external stop portion diameter that gradually increases in size along the stop portion length, wherein the one or more axial slits in the stop portion allow the stop portion to transition from the first external stop portion diameter to the second external stop portion diameter; and (c) a stop translatable along the anchoring device and engageable with the interior of the stop portion, wherein the stop gradually increases in diameter along an axis extending through a longitudinal direction of the stop from a first diameter to a second diameter, wherein the anchoring device is rotatable into the restraint position such that the stop is at least partially received within the interior of the stop portion to transition the stop portion into the second external stop portion diameter, and wherein when the stop portion is transitioned into the second external stop portion diameter, the stop portion resists movement of the stop as it translates along the anchoring device, and wherein the second external stop portion diameter is greater than the attachment bore diameter such that the stop portion engages the interior surface of the vehicle body to selectively define an interference fit between the collar, the stop portion, and the attachment bore when the anchoring device is in the restraint position.

6. The tie down of claim 5, wherein the anchoring device is rotatable in a second direction to translate the stop along the anchoring device out of locking engagement within the stop portion of the retention body, thereby decreasing the stop portion diameter.

7. The tie down of claim 5, wherein the anchoring device includes a threaded portion and an attachment portion.

8. The tie down of claim 7, wherein the attachment portion comprises an eyelet.

* * * * *